United States Patent [19]
Brule'

[11] Patent Number: 4,567,906
[45] Date of Patent: Feb. 4, 1986

[54] APPARATUS FOR RAPID QUENCHING AND CONTROLLED COOLING OF RELATIVELY LIGHTWEIGHT ELEMENTS

[75] Inventor: Paul L. Brule', Plainwell, Mich.

[73] Assignee: LaRos Equipment Company, Inc., Portage, Mich.

[21] Appl. No.: 547,707

[22] Filed: Nov. 1, 1983

[51] Int. Cl.$^4$ .............................................. B08B 3/04
[52] U.S. Cl. ................... 134/127; 134/133; 134/DIG. 2; 198/592
[58] Field of Search ..................... 134/67, 70, 71, 124, 134/126–128, 48, DIG. 2, 133; 198/342, 592, 832–834; 99/516, 534, 536

[56] References Cited

U.S. PATENT DOCUMENTS

| | | | |
|---|---|---|---|
| 2,086,877 | 7/1937 | Paxton | 134/127 X |
| 2,684,681 | 7/1954 | Wallerius et al. | 134/127 |
| 2,713,346 | 7/1955 | Sucksdorff | 134/127 X |
| 4,011,935 | 3/1977 | Massey | 198/592 X |
| 4,050,575 | 9/1977 | Rossio | 198/834 |
| 4,138,940 | 2/1979 | Fujii | 99/640 X |
| 4,171,044 | 10/1979 | Rossio | 198/834 |

Primary Examiner—Philip R. Coe
Assistant Examiner—Frankie L. Stinson
Attorney, Agent, or Firm—Flynn, Thiel, Boutell & Tanis

[57] ABSTRACT

An apparatus for submersing a plurality of elements in a liquid, including an upwardly open tank, a quantity of liquid in the tank, and a perforated plate having a guide surface on the underside thereof and extending from a first location in the region of the surface of the liquid to a second location spaced below the surface of the liquid. A submersion conveyor provided in the tank includes an endless belt having a plurality of spaced and transversely extending cleats, the submersion conveyor being positioned so that, during at least a portion of the path of travel of the cleats, the cleats are adjacent and move along the guide surface from the first location to the second location thereon. Thereafter, cleats on an endless belt of a further conveyor move the elements through the tank below a further guide surface portion on the underside of the perforated plate and then move the elements upwardly and out of the tank. The belt of the submersion conveyor is preferably driven at a substantially higher speed than the belt of the further conveyor.

20 Claims, 8 Drawing Figures

APPARATUS FOR RAPID QUENCHING AND CONTROLLED COOLING OF RELATIVELY LIGHTWEIGHT ELEMENTS

FIELD OF THE INVENTION

This invention relates to an apparatus for submersing a submersible element in a liquid and, more particularly, to an apparatus adapted to rapidly submerse extruded or molded plastic elements having a specific gravity which is less than or approximately equal to 1.0 relative to the liquid.

BACKGROUND OF THE INVENTION

In the manufacture of plastic parts, controlled cooling of the parts following formation thereof is very important to ensure that dimensional tolerances are maintained and to ensure that the parts have certain required physical properties, for example with respect to surface characteristics.

Controlled cooling of molded plastic parts can be carried out in a satisfactory manner by keeping them in the mold during the cooling period, but this is a highly inefficient use of the molding equipment. Alternatively, it has previously been found that molded or extruded plastic parts can be satisfactorily cooled by submerging them in water for a selected period of time.

A conventional apparatus which has been used for this purpose is similar to the apparatus disclosed in U.S. Pat. Nos. 4,050,575 and 4,171,044, and includes a tank which is filled with the cooling liquid and an endless belt conveyor which carries parts deposited in the tank through the liquid in the tank for a predetermined period of time and then carries the parts upwardly and out of the liquid in the tank. This apparatus has worked very well for parts which are substantially heavier than the liquid in the tank, or in other words which have a specific gravity relative to the liquid which is substantially in excess of 1.0, because these parts promptly sink in the liquid and thus promptly come to rest on the conveyor belt. This apparatus has not, however, proved satisfactory for relatively lightweight parts, namely, parts having a specific gravity which is less than or approximately equal to 1.0.

More specifically, parts which have a specific gravity less than 1.0 will float on the surface of the liquid, and parts having a specific gravity approximately equal to or slightly greater than 1.0 will, due to surface tension of the liquid, tend to float on the surface of the liquid. Accordingly, these parts are typically not immersed promptly or uniformly, and thus do not undergo cooling in the uniform manner required to assure consistent tolerances and physical properties. Moreover, since these parts do not promptly sink onto the endless conveyor belt, there is a lack of uniformity in the amount of time the parts are submerged in the liquid. In other words, the parts are not submerged in the liquid for a specific period of time in a first-in/first-out manner, but instead spend a period of time in the liquid which is partly dependent on the time required for the part to sink, which time can hence not be precisely controlled.

Thus, other arrangements have typically been used to quench and cool relatively lightweight plastic parts. One known approach is to place the parts in a tank which is filled with a liquid and has an agitator mechanism. Agitation of the liquid causes the parts to bob around in the liquid. However, the exposure to the liquid is not as uniform as when the parts are submerged, and it has been virtually impossible with this apparatus to accurately control the amount of time each part is present in the liquid. An alternative approach has been to spray the parts with a stream of liquid, but this provides less uniform cooling of the parts than the agitator tank.

Accordingly, an object of the invention is to provide an apparatus for rapidly submersing relatively lightweight elements, including floatable elements, in a liquid in a uniform manner.

A further object of the invention is to provide an apparatus, as aforesaid, which submerses and removes parts from the liquid in a first-in/first-out manner, such that each part is immersed in the liquid for a predetermined period of time and is thus subjected to controlled cooling in a uniform manner.

A further object of the invention is to provide an apparatus, as aforesaid, which is simple, requires minimal maintenance, and is relatively inexpensive to manufacture.

SUMMARY OF THE INVENTION

The objects of the invention, including those set forth above, are met by providing an apparatus which includes a tank, a quantity of the liquid (i.e. water) in the tank, a downwardly facing first guide surface in the tank extending from a first location in the region of the surface of the liquid to a second location spaced below the surface of the liquid, and a conveying arrangement cooperable with submersible elements in the region of the first location for moving such submersible elements along the first guide surface from the first location to the second location to effect rapid and uniform submersion of the elements.

In a preferred embodiment of the invention, the apparatus includes a first conveyor having at least two rotatably supported rollers and an endless belt supported on the rollers, the endless belt having a plurality of transversely extending cleats thereon and being positioned so that, during at least a portion of the path of travel of the cleats, the cleats are adjacent the first guide surface and move therealong from the first location to the second location to effect submersion of the elements. A second downwardly facing guide surface is provided in the tank and extends from a third location in the region of the second location to a fourth location above the surface of the liquid, and the submersible elements are moved from the third location to the fourth location by a second conveyor having an endless belt with transversely extending cleats which, during a portion of their path of travel, are adjacent and move along the second guide surface from the third location to the fourth location. The first conveyor preferably moves at a relatively high speed and, in cooperation with the first guide surface, rapidly submerses the elements to be cooled. The second conveyor preferably runs at a relatively slow speed and, in cooperation with the second guide surface, maintains each element fully submersed in the liquid for a predetermined period of time. Since the cleated conveyors and guide surfaces essentially define a plurality of compartments which move in a sequential manner from the first location to the second location, and from the third location to the fourth location, the submersible elements are submersed in and removed from the liquid in a first-in/first-out manner.

The guide surface in the tank is preferably the undersurface of a plastic plate which has a plurality of perforations therethrough and is removably suspended in the tank by a plurality of hangers.

DETAILED DESCRIPTION

Figure 1:
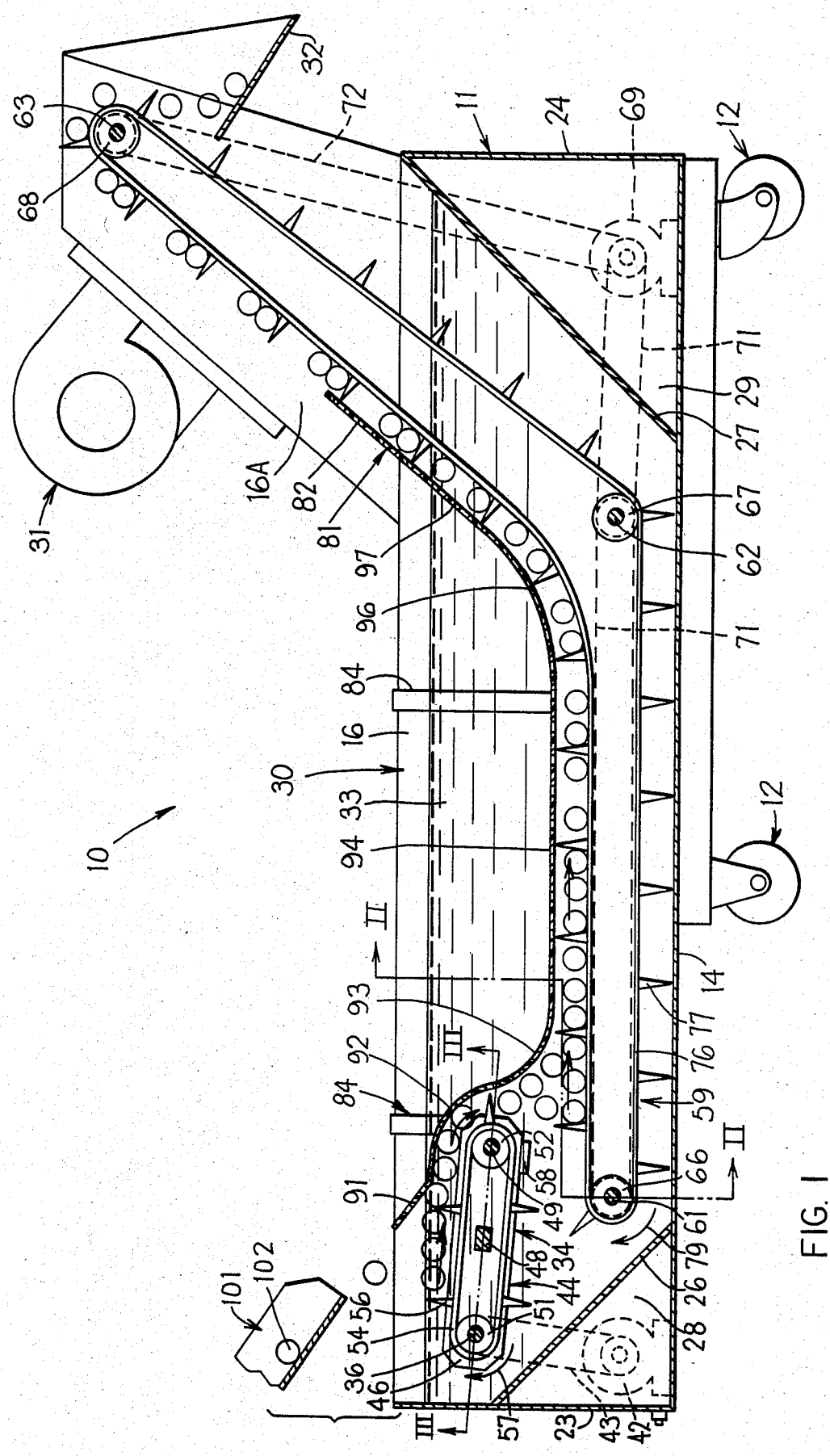
FIG. 1 is a sectional side view of a submersion apparatus embodying the present invention.

Referring to FIG. 1, a submersion apparatus 10 which embodies the present invention includes an upwardly open tank 11 which is movably supported on a plurality of rollers 12.

Figure 2:
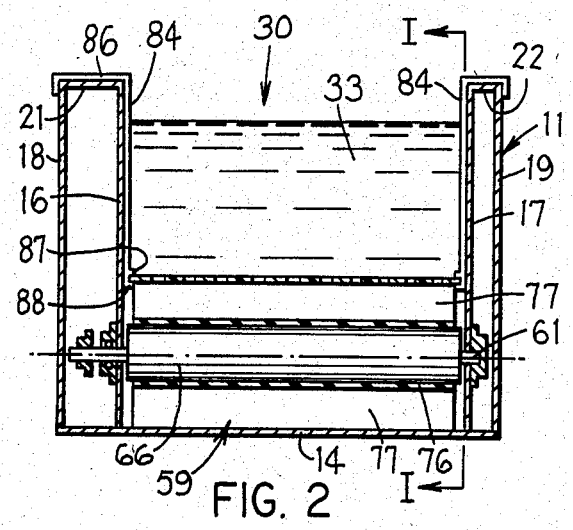
FIG. 2 is a sectional view taken along the line II—II of FIG. 1.

As shown in FIGS. 1 and 2, the tank 11 includes a substantially horizontal bottom wall 14, outer sidewalls 18 and 19, spaced inner sidewalls 16 and 17 between and parallel to the outer sidewalls 18 and 19, top walls 21 and 22 which extend between and are secured to the upper ends of respective inner and outer sidewalls, and vertical end walls 23 and 24. Inclined end walls 26 and 27 are provided adjacent each end of the tank 11 and extend between the inner sidewalls 16 and 17, thereby defining respective motor compartments 28 and 29 at opposite ends of the tank 11.

The inner side wall 16 has a portion 16A which projects upwardly at one end of the tank, and the inner side wall 17 has a corresponding portion which is not illustrated in the drawings. These wall portions support a conventional fan or blower 31, and an inclined discharge ramp 32.

The tank 11 hence defines therein an upwardly opening compartment 30 which is substantially filled with a liquid 33, which in the preferred embodiment is water.

Figure 3:
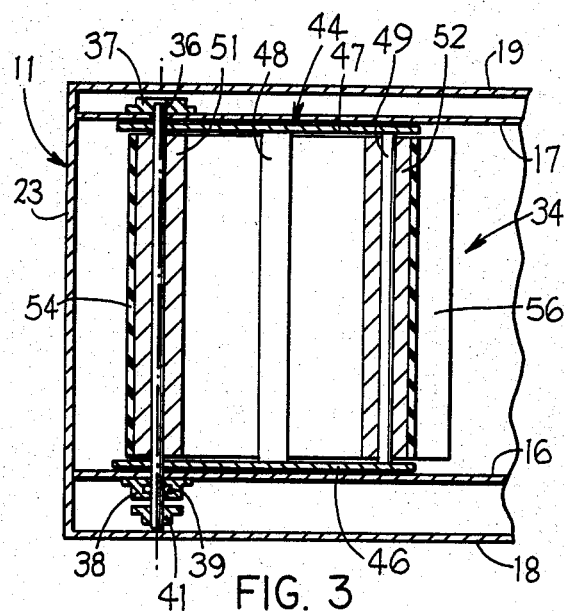
FIG. 3 is a sectional view taken along the line III—III of FIG. 1.

Referring to FIGS. 1 and 3, the submersion apparatus 10, at the inlet end thereof, includes a submersion conveyor 34, which in turn includes an axle 36 which extends rotatably through openings provided in the inner sidewalls 16 and 17. Bearing members 37 and 38 are secured in a conventional, fluid-tight manner to the outer sides of the inner sidewalls 17 and 16, respectively, support the axle 36 for rotation, and also prevent water from leaking from the tank 11 through the openings in sidewalls 16 and 17. The axle 36 extends completely through the bearing member 38, and the bearing member 38 therefore has a conventional annular seal 39 which encircles axle 36 to prevent fluid from leaking out of the tank compartment 30. The end of axle 36 has a spur gear 41 fixedly secured thereto.

A conventional electric motor 42 is provided in the motor compartment 28, and its drive shaft has a spur gear thereon which is drivingly connected to the gear 41 by a conventional drive chain 43.

The submersion conveyor 34 includes a support assembly 44 which is pivotally supported on the axle 36 and includes spaced elongated side plates 46 and 47 which are each adjacent and parallel to a respective one of the inner sidewalls 16 and 17 and each has an opening near one end through which the axle 36 is rotatably received. If desired, conventional plastic bushings (not illustrated) can be provided in the openings through the side plates 46 and 47 to minimize wear caused by rotation of the axle 36. A rigid and elongated bar 48 extends between and is secured to the side plates 46 and 47 approximately intermediate the ends thereof. An axle 49 which is substantially parallel to the axle 36 extends between and is secured to the side plates 46 and 47 near the ends thereof remote from the axle 36. The axle 49 is preferably supported in a conventional and not-illustrated manner for positional adjustment in directions toward and away from the axle 36.

The axle 36 has a cylindrical roller 51 fixedly and coaxially secured thereto, and the axle 49 has a cylindrical roller 52 rotatably and coaxially supported thereon. An endless conveyor belt 54 is supported on the rollers 51 and 52 and has a plurality of spaced, transversely extending, outwardly projecting cleats or blades 56 secured thereon. Rotation of the axle 36 and roller 51 by the motor 42 causes the endless belt 54 to move in the direction indicated by arrow 57 in FIG. 1.

Figure 4:
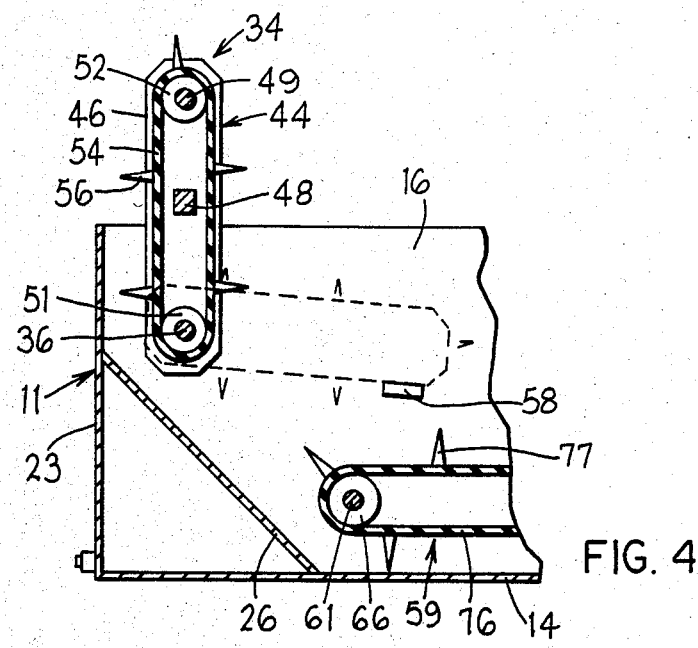
FIG. 4 is a fragmentary sectional side view of the apparatus of FIG. 1 showing the submersion conveyor thereof in a raised position.

The entire submersion conveyor 34 is pivotal about the axle 36 between a generally vertical maintenance position shown in FIG. 4 in which the reaches of the belt 54 extend generally vertically, and an operational position shown in FIG. 1 in which the reaches of the belt are inclined from a horizontal position by a small angle such as approximately five degrees, whereby the axle 49 is slightly lower than the axle 36. A stop 58 is secured to the inner surface of the inner sidewall 16, and a similar stop (not illustrated) is provided on the inner sidewall 17. The side plates 46 and 47 each rest on a respective one of the stops in the operational position shown in FIG. 1, and the stops thus prevent pivotal movement of the submersion conveyor 34 in a clockwise direction beyond the operational position shown in FIG. 1.

As shown in FIG. 1, the conveyor 34 is hence positioned closely adjacent but below the surface of the liquid 33. The positioning is preferably such that the tips or free ends of the cleats 56, when in their uppermost position as they pass around the roller 51, are closely adjacent the surface of the liquid 33.

A further conveyor 59 is similar in some respects to the conveyors disclosed in U.S. Pat. Nos. 4,050,575 and 4,171,044, the disclosures of which are incorporated herein by reference. The conveyor 59 includes three horizontally extending, parallel axles 61, 62 and 63 which are rotatably supported on the inner sidewalls 16 and 17 in a manner substantially identical to the manner in which the axle 36 is supported thereon. The axles 61 and 62 are horizontally spaced and are located near the bottom of the tank 11, the axle 61 being located below the submersion conveyor 34 when the submersion conveyor is in the operational position shown in FIG. 1. The axle 63 is located above the surface of the liquid 33 and is positioned above the discharge ramp 32. Cylindrical rollers 66, 67 and 68 are respectively fixedly secured to the axles 61, 62 and 63 coaxial therewith. A conventional motor 69 is provided in the motor compartment 29 and is operatively coupled to respective gears provided on each of the axles 61, 62 and 63 by conventional drive chains 71 and 72. It will be recognized, however, that for certain applications it would be sufficient to operatively couple the motor 69 to only one of the axles 61, 62 and 63.

An endless conveyor belt 76 is supported on the rollers 66, 67 and 68, and has a plurality of longitudinally spaced, transversely extending, outwardly projecting cleats 77 thereon. These cleats or projections 77 extend across the full width of the belt. The motor 69 effects movement of the endless belt 76 in the direction indicated by arrow 79.

A submersion plate 81 has a plurality of perforations 82 therethrough and is removably suspended within the tank 11 by a plurality of hangers 84. The underside of the plate 81 serves as a guide surface, as described in detail hereinafter. The plate 81 is preferably made of a durable and relatively rigid plastic material, such as that which is commercially available under the name LEXAN. The plate 81 is also preferably made of a substantially clear plastic to facilitate observation of the apparatus therebelow. The plate 81 could, however, be made of other materials, for example a metal screen.

Each hanger 84 has a hooklike portion 86 at the upper end thereof which grips over a respective one of the top walls 21 and 22 of the tank 11, has a further portion which extends downwardly along the associated inner sidewall 16 or 17, and has two spaced, inwardly projecting flanges 87 and 88 at its lower end, the adjacent lateral edge of the plate 81 being received between the flanges 87 and 88.

The plate 81, at one free end thereof, has a planar portion 91 which extends downwardly at an incline from a location adjacent the top of the sidewalls of the tank 11 to a location adjacent the surface of the liquid 33 in the tank, followed by a concavely curved portion 92 which is approximately arcuate and is approximately concentric with the axle 49 when the conveyor 34 is in the operational position shown in FIG. 1. The concave portion 92 is followed by a convexly curved portion 93, which in turn is followed by a generally planar and horizontally extending portion 94. An upwardly curved portion 96 follows the planar portion 94, and is in turn followed by a planar portion 97 which extends upwardly at an incline to a location above the surface of the liquid 33 in the tank 11. As mentioned above, the curved portion 92 of the plate 91 is approximately concentric with the axle 49, and the cleats 56 on the endless belt 54 are dimensioned so that the tips thereof are adjacent and move along the undersurface of the portion 92 of the plate 81 for substantially the full length thereof. Similarly, the portions 94, 96 and 97 of the plate 81 extend approximately parallel to the adjacent portion of the upper reach of the endless belt 76, and the cleats 77 thereon are dimensioned so that the tips thereof are adjacent and move along the undersurface of these portions of the plate 81.

As shown in FIG. 1, the submersion apparatus 10 is normally positioned beneath a discharge chute 101 which supplies plastic elements 102 to be submersed to the surface of the liquid 33 in the region thereof above the conveyor 34, which region is not covered by the plate 81 but is adjacent the lip portion 91 thereof. The submersion apparatus 10 is designed for use with plastic elements 102 which have a specific gravity relative to the liquid 33 which is approximately equal to 1.0, which elements hence do not sink quickly due to surface tension.

The motor 42 preferably drives the endless belt 54 of the submersion conveyor 34 at a substantially higher speed than the motor 69 drives the endless belt 76 of the conveyor 59. Belt 54 is normally driven at a speed which is between five to thirty times the speed of belt 76. For example, the belt 76 is preferably driven at a speed of about 1 to 5 feet per minute, and the belt 54 is preferably driven at a speed of approximately 30 feet per minute.

The plate 81 guides the upper reach of the endless belt 76 and holds it in its desired curved configuration, thus eliminating the need for special guide members which are typically provided above and/or below the upper reach of the endless belt in existing conveyors of this general type, such as those disclosed in U.S. Pat. Nos. 4,050,575 and 4,171,044.

Figure 5:
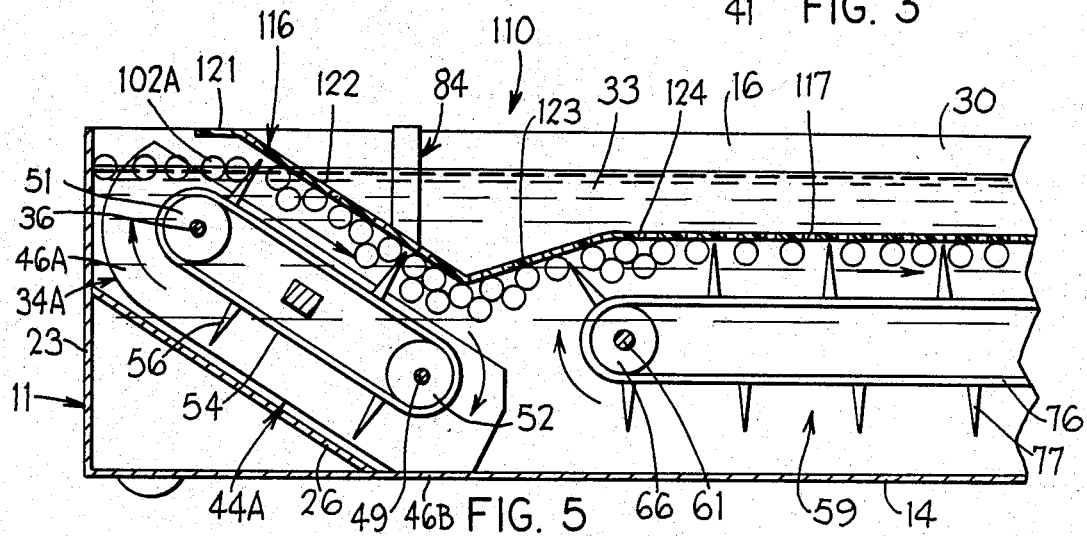
FIG. 5 is a fragmentary sectional side view of an alternative embodiment of the invention.

The alternative embodiment 110 of the submersion apparatus shown in FIG. 5 is substantially identical to the embodiment of FIG. 1, except as described hereinafter. Accordingly, identical parts have been identified with the same reference numerals, and similar parts have been identified with the same reference numeral followed by a letter "A" or "B".

The conveyor 110 of FIG. 5 does not have stops on the sidewalls 16 and 18 of the tank 11 as at 58 in FIG. 1. Instead, side plate 46A has an inclined edge 46B at the end thereof remote from the axle 36 which rests on the bottom wall 14 of the tank 11 when the conveyor support assembly 44A is in its operational position, as shown in FIG. 5, thus preventing further pivotal movement of the conveyor support assembly 44A in a clockwise direction. In the operational position shown in FIG. 5, the reaches of the endless belt 54 are inclined to the horizontal by an angle of approximately 30°, and the tips of the cleats 56 preferably project slightly above the surface of the liquid 33 as they pass over the top of roller 51.

The axle 61 of the conveyor 59 is not located below the submersion conveyor 34A, but instead is spaced horizontally downstream from and is slightly higher than the axle 49.

The submersion plate 116 of the embodiment of FIG. 1 has perforations 117 and is suspended by hangers 84. Plate 116 differs from the submersion plate 81 in the embodiment of FIG. 1 primarily with respect to its shape. More specifically, the end of the submersion plate 116 nearest the submersion conveyor 34A has a short horizontal portion 121 which is spaced a small distance above the surface of the liquid 33 and is followed by a substantially planar portion 122 which is inclined downwardly substantially parallel to the upper reach of the endless belt 54. A substantially planar portion 123 extends upwardly from the lower end of the portion 122 at a small angle, and is followed by a planar, generally horizontal portion 124 which is substantially parallel to the upper reach of the endless belt 76. The remainder of the submersion plate 116 is substantially identical in shape to the portions 96 and 97 of the plate 81.

The cleats 56 on the endless belt 54 are dimensioned so that the tips thereof are adjacent and move along the underside of the portion 122 of the submersion plate 116. Similarly, the cleats 77 on the endless belt 76 are dimensioned so that the tips thereof are adjacent and move along the underside of the portion 124 of the submersion plate 116.

Figure 6:
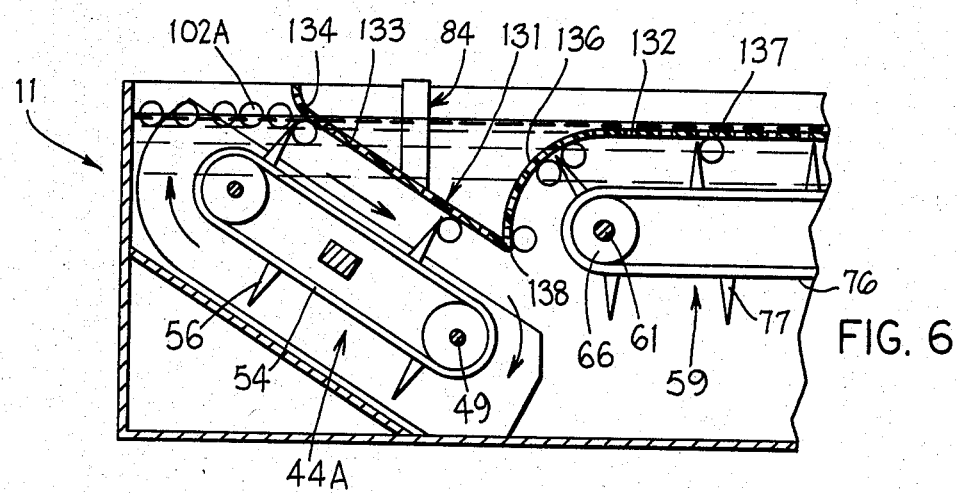
FIG. 6 is a fragmentary sectional side view similar to FIG. 5 which shows a variation of the embodiment of FIG. 5.

The submersion apparatus 110 is designed for use with plastic elements 102A having a specific gravity relative to liquid 33 which is substantially less than 1.0, which elements hence easily float in the liquid.

Where the elements 102A have a specific gravity relative to the liquid 33 which is only slightly less than 1.0, their buoyancy is sometimes insufficient to cause them to move in a dependable manner up the inclined portion 123 of the submersion plate 116 in the embodiment of FIG. 5. A further embodiment shown in FIG. 6 is designed to eliminate this problem. This embodiment is similar to that of FIG. 5, except that a submersion plate 131 with a different shape has been provided and the conveyor 59 has been repositioned.

More specifically, the submersion plate 131 has perforations 132 and is suspended by hangers 84. It has a substantially planar portion 133 which is inclined downwardly substantially parallel to the upper reach of the endless belt 54, and has a short arcuate portion 134 which is provided at the upper end of the portion 133 and curves upwardly away from the endless belt 54. An arcuate portion 136 has a lower end which extends generally vertically upwardly from the lower end 138 of the portion 133, and has a generally horizontal upper end which merges into a horizontal portion 137 of the plate 131 disposed above and substantially parallel to the upper reach of the endless belt 76. The conveyor 59 is positioned slightly higher in the tank 11 in the embodiment of FIG. 6 than in the embodiment of FIG. 5, the axle 61 being slightly higher than the lower end 138 of the portion 133 of the plate 131. The arcuate portion 136 of the plate 131 is concentric with the axle 61, and the tips of the cleats 77 on the endless belt 76 slidingly engage and move along the arcuate portion 136 and the horizontal portion 137 of the submersion plate 131.

Figure 7:
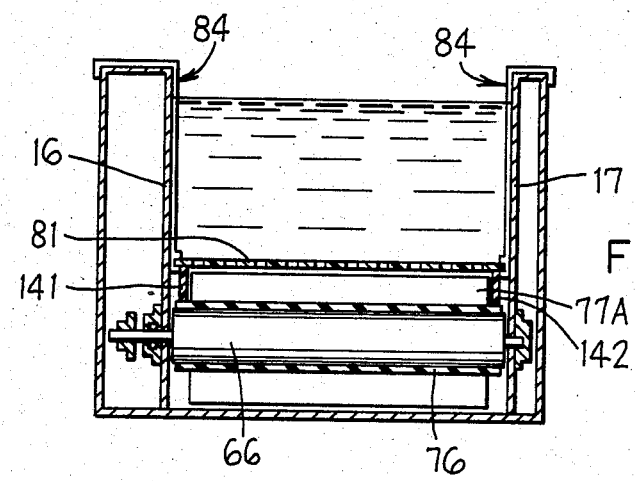
FIG. 7 is a sectional end view similar to FIG. 2 and showing a further alternative embodiment of the apparatus of FIG. 1.

FIG. 7 is a view similar to FIG. 2 which shows a variation of the apparatus according to FIG. 1. The apparatus of FIG. 7 differs from that of FIG. 2 in that spaced, parallel guide walls 141 and 142 are secured in a conventional manner to the submersion plate 81 adjacent respective lateral edges thereof and extend generally vertically downwardly, the lower end of each guide wall 141 and 142 slidably engaging the upper surface of the upper reach of the endless belt 76. The cleats 77A on the endless belt 76 are slightly shorter in length than the distance between the guide walls 141 and 142 so that they can be movably received between the guide walls 141 and 142, and have a height which is slightly less than that of the guide walls 141 and 142 so that the tip of each cleat 77A is spaced slightly from the underside of the submersion plate 81. In this variation, the guide walls 141 and 142 hence function as holddowns for maintaining the belt 76 in the desired configuration.

Figure 8:
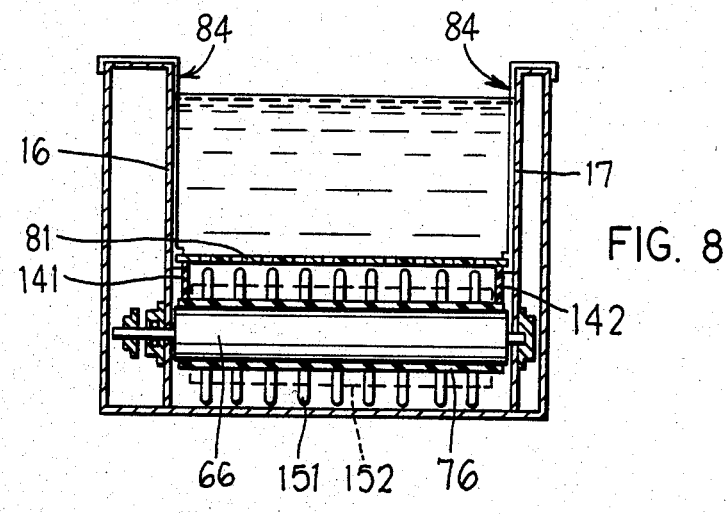
FIG. 8 is a sectional end view similar to FIG. 2 and showing still a further alternative embodiment of the apparatus of FIG. 1.

FIG. 8 is a view similar to FIGS. 2 and 7, and shows a variation of the embodiment according to FIG. 7. The embodiment of FIG. 8 is substantially identical to that of FIG. 7, except that the endless belt 76 has a plurality of transversely extending rows of outwardly projecting fingers 151 thereon in place of the transversely extending cleats 77A. The fingers 151 are preferably made of a material having at least a small amount of resilient flexibility, and are rounded at their outer ends. The length of each finger 151 is normally slightly less than the height of the guide walls 141 and 142, so that the end of each finger 151 is spaced slightly from the underside of the submersion plate 81 when moving therepast. An optional, transversely extending cleat, which is shown in broken lines at 152, can be provided adjacent each transverse row of the fingers 151 in order to give crosswise rigidity to the endless belt 76 and, where the fingers 151 are resiliently flexible, can be positioned to abut the rear sides of the fingers 151 to limit excessive rearward flexing movement thereof. These cleats 152 are substantially shorter than the fingers 151. Alternatively, the fingers 151 could be integral with and project outwardly from the tips of the cleats 152.

The embodiment of FIG. 8 is particularly suitable for use with elongate elements which might occasionally become oriented in a manner so that they bridge the top of a cleat of the type shown in FIG. 2 and thus become wedged between the cleat and the submersion plate. In the embodiment of FIG. 8, elongate parts can always move downwardly between adjacent fingers 151.

OPERATION

Referring to FIG. 1, molded or extruded plastic elements 102 are periodically supplied by the discharge chute 101 to the surface of the fluid 33 in the region adjacent the portion 91 of the plate 81. These elements have a specific gravity relative to the liquid 33 which is approximately equal to 1.0 and thus are capable of sinking in the liquid 33, but have a tendency to remain near the surface thereof due to surface tension of the liquid 33.

As discussed hereinabove, the submersion conveyor 34 runs at a relatively high rate of speed, and the cleats 56 thereof will quickly move the elements 102 toward the plate 81 and then guide them along the underside of the portion 92 thereof so that they are promptly submerged in the liquid 33 after being deposited in the tank 11. Once the elements 102 have been submerged, they will tend to sink and will drop down onto the endless belt 76. The cleats 77 on the belt 76, which moves at a slower rate of speed than the belt 54 of the submersion conveyor, will slowly move the elements 102 through the tank 11 below the portions 94 and 96 of the plate 81 and then upwardly out of the tank 11 and through a stream of air from the blower 31. As the endless belt 76 goes around the roller 68, the elements 102 drop onto and roll down the discharge ramp 32, and drop into a conventional receptacle which is not illus- trated.

In this manner, the submersion apparatus 10 ensures that the elements 102 are promptly submerged, that they are submerged and removed from the liquid 33 in a first-in/first-out manner, and that the elements 102 each remain in the liquid 33 for a predetermined and relatively uniform period of time.

The plate 81 and hangers 84 can be removed from the tank 11 by lifting them upwardly, and the submersion conveyor 34 can then be manually pivoted upwardly around the axle 36 to the position shown in FIG. 4. In this position, maintenance and adjustments can be easily performed, such as adjustment of the position of axle 49 in order to adjust the tension on the endless belt 54.

The operation of the embodiment of FIG. 5 will now be described. As mentioned above, this embodiment is designed for elements 102A which have a specific gravity relative to the liquid 33 which is substantially less than 1.0, so that the elements 102A will always float in the liquid 33. When these elements are deposited on the surface of the liquid 33 adjacent the portion 121 of the submersion plate 116, the cleats 56 of the submersion conveyor 34A will move the elements 102A along the surface of the liquid 33 to the planar portion 122 of the plate 116, and then downwardly along the underside of this portion of the plate. Due to the fact that the elements 102A float in the liquid 33, they will thereafter move upwardly along the underside of the upwardly inclined portion 123 of the plate 116, until they reach the portion 124 of the plate. The cleats 77 of the endless belt 76 will move the elements 102A along the underside of the portion 124 of the plate 116, and then upwardly and out of the liquid 33 in a manner similar to that described above with respect to the embodiment of FIG. 1.

The embodiment of FIG. 6 operates in a manner similar to that of the embodiment of FIG. 5, except as described hereinafter. When the elements 102A in the embodiment of FIG. 5 reach the lower end of the inclined portion 122 of the plate 116, their buoyancy then causes them to move rapidly upwardly along the inclined portion 123 of the plate until the cleats 77 on the conveyor 59 can engage them and move them along the undersurface of the plate. When the elements 102A have a specific gravity which is only slightly less than that of the liquid 33, they are sometimes somewhat reluctant to move upwardly along the inclined portion 123 of the plate in a uniform manner. The embodiment of FIG. 6 avoids this problem. More specifically, when the elements 102A reach the lower end 138 of the inclined portion 133 of the plate 131, they are in a position where they can move almost directly vertically upwardly. Since the force generated by their buoyancy is directed upwardly, it is more effective in moving the elements 102A upwardly than in moving them along the inclined portion 123 of the plate in the embodiment of FIG. 5. Moreover, the elements 102A which pass the lower end 138 (FIG. 6) of the inclined portion 133 of the submersion plate are necessarily disposed within the path of movement of the cleats 77 of the conveyor 59, and thus do not need to move a certain distance along the plate before reaching the conveyor 59, as they do in the embodiment of FIG. 5. The cleats 77 of the conveyor 59 in the embodiment of FIG. 6 also create a fluid flow along the underside of the arcuate portion 136 of the plate 131 which tends to urge the elements 102A upwardly along the arcuate portion 136 as soon as they have passed the lower end 138 of the inclined portion 133. The embodiment of FIG. 6 thus ensures that the slightly buoyant elements 102A are moved along the submersion plate 131 in a uniform manner, so that each element 102A is fully immersed in the liquid for a predetermined interval of time.

The embodiments of FIGS. 7 and 8 operate in substantially the same manner described above in association with the embodiment of FIGS. 1–4, and the operation of the embodiments of FIGS. 7 and 8 is therefore not described in detail. These latter embodiments are, however, advantageous in that the cleats or fingers do not slidably drag along the underside of the submersion plate.

In other respects, the embodiment of FIG. 5 operates in a manner substantially identical to that described above with respect to FIG. 1.

The embodiments of the invention in which an exclusive property or privilege is claimed are defined as follows:

1. An apparatus for rapid quenching and controlled cooling of a plurality of elements, comprising:
   upwardly opening tank means for containing a quantity of cooling liquid therein;
   guide means stationarily supported on said tank means and defining thereon a stationarily downwardly facing guide surface which extends longitudinally of said tank means from an inlet location disposed adjacent one end of said tank means to an outlet location disposed adjacent the other end of said tank means;
   said guide means including a first portion defining thereon a first part of said stationary guide surface which extends from said inlet location in the region of the surface of the liquid in the tank means to a second location which is spaced below the surface of the liquid and is also spaced longitudinally along the tank means from said inlet location;
   said guide means including a second portion defining thereon a second part of said stationary guide surface which extends below the surface of the liquid along a substantial longitudinal extent of the tank means from adjacent said second location to a third location which is below the surface of the liquid and is disposed more closely adjacent the other end of said tank means;
   said guide means including a third portion defining thereon a third part of said stationary guide surface which extends from said third location to said outlet location, the latter being adjacent or above the surface of the liquid;
   first conveying means disposed adjacent said one end of said tank means and cooperable with the elements in the region of said inlet location for positively moving said elements downwardly from said inlet location to said second location for submerging said elements, said first conveying means including a first endless conveying element having an upper reach which is spaced downwardly from said first part of said guide means and which is movable in a direction from said inlet location toward said second location;
   second conveying means for moving the submerged elements from adjacent said second location through said third location to said outlet location, said second conveying means including a second endless conveying element having an upper reach which is spaced downwardly from but extends substantially parallel to the second part of said stationary guide surface and is movable in a direction from said second location toward said third location; and
   means for effecting positive submerging of the elements into the liquid at said inlet location and for accurately controlling the length of time the elements are submerged in the liquid as they move from said inlet location to said outlet location, said means including a plurality of first and second projections fixed to and projecting outwardly from the respective first and second conveying elements at longitudinally and substantially uniformly spaced intervals therealong, said projections projecting outwardly from the respective conveying element through a substantial extent so that the tips of said first projections as associated with the upper reach of said first conveying element are closely adjacent and move along a substantial portion of the first part of said guide surface, and the tips of the second projections as associated with the upper reach of said second conveying element are closely adjacent and move along the second part of said guide surface, said projections in cooperation with said guide surface effectively defining substantially closed compartments for confining the elements to accurately control the time of submersion of the elements within the liquid.

2. An apparatus according to claim 1, including drive means drivingly coupled to said first and second conveying means for effecting movement of said first conveying element at a substantially higher speed than said second conveying element.

3. An apparatus according to claim 1, wherein said guide means includes a fourth portion defining thereon a fourth part of said stationary guide surface which extends upwardly and forwardly from said second location for merger with the second part of said guide surface, said fourth part of said guide surface being wholly below the surface of the liquid.

4. An apparatus according to claim 1, wherein said guide means comprises a substantially continuous platelike member which is stationarily supported on said tank means and extends from said inlet location to said outlet location, said platelike member over a majority of the extent thereof being submerged below the surface of the liquid.

5. An apparatus according to claim 4, wherein said platelike member is transparent and has small perforations therethrough for preventing entrapment of air below the platelike member.

6. An apparatus according to claim 5, wherein the tank means includes upwardly projecting sidewalls, said platelike member extending between said sidewalls and having opposite lateral edges which are adjacent said sidewalls, and including hangers secured to and extending generally upwardly from the lateral edges of said platelike member, said hangers having hook portions which cooperate with the upper edges of the sidewalls for stationarily but removably supporting said platelike member on said tank means.

7. An apparatus according to claim 4, wherein said tank means includes a pair of upwardly projecting sidewalls, each of said conveying elements comprising an endless belt having a width which closely approximates the spacing between said sidewalls, said projections extending laterally across said belt throughout substantially the full width thereof, and said platelike member also extending laterally across said tank throughout substantially the full width of the spacing between the sidewalls.

8. An apparatus according to claim 7, wherein said platelike member has the first part thereof provided with a substantially linear downwardly sloping configuration as it projects away from said one end of said tank means from said inlet location to said second location, said platelike member having a fourth part which extends upwardly and forwardly from said second location while remaining completely submerged below the surface of the liquid, said fourth part extending longitudinally of the tank means through only a short distance and being joined to said second part with the latter extending longitudinally of the tank means through a substantial distance to said third location while being wholly submerged below the surface of the liquid, and said third part being joined to said second part through a smoothly curved configuration so as to project upwardly above the surface of the liquid to said outlet location.

9. An apparatus according to claim 8, wherein the upstream end of said second conveying means is disposed in the vicinity of said fourth part so that the projections on said second conveying element engage the elements to forcibly move the elements upwardly along the fourth part and thence along the second part toward said third location.

10. An apparatus according to claim 9, wherein said first conveying means extends substantially along only said first part and has the downstream end thereof substantially at said second location.

11. An apparatus according to claim 7, wherein the first part of said platelike member is of a smoothly curved concave configuration which projects forwardly and smoothly curves downwardly away from the surface of the liquid, said first conveying means having a downstream end which is located adjacent but below this smoothly curved first part so that said first projections engage the elements and positively submerge them, said first part at its lower end being smoothly and reversely curved to merge into said second part with the latter projecting longitudinally of said tank means away from said first part until reaching said third location, said second part being wholly submerged below the surface of the liquid, and said third part being joined to said second part through a smoothly curved configuration so that said third part projects upwardly above the surface of the liquid, said second conveying means having an upstream end which is disposed downwardly from but which longitudinally overlaps said first conveying means so that the elements which are positively submerged by said first conveying means will move past the downstream end of said first conveying means for deposit on the upper reach of said second conveying means.

12. An apparatus according to claim 7, wherein said second conveying element extends from said second location through said third location to said outlet location.

13. An apparatus according to claim 12, wherein at least one of said first and second projections are formed by a plurality of resilient fingers which project outwardly from the respective conveying element and are disposed within a transversely extending row, said fingers being of sufficient extent that the tips thereof are movable long the respective guide surface in adjacent relationship thereto.

14. An apparatus according to claim 12, wherein said first conveying means has an upstream end thereof disposed closely adjacent said one end of said tank means, said upstream end being disposed between said one end of said tank means and said inlet location on said guide means so as to define a region for depositing said elements onto the surface of the liquid in the tank, said upstream end of said first conveying means being disposed substantially below the surface of the liquid so that the first projections pass through a path of movement which causes the first projections to project above the surface of the liquid for engaging the elements in the vicinity of said inlet location, said first conveying means being sloped downwardly from the upstream to the downstream end thereof so that the latter end is submerged below the surface of the liquid and is also spaced downwardly from said stationary guide means in the vicinity of said second location.

15. An apparatus according to claim 7, wherein said first and second conveying elements comprise flat endless belts, and wherein said first and second projections comprise cleats which are fixed to and project outwardly from the respective belt and extend transversely across substantially the complete width thereof, said cleats in their outwardly Projecting direction having at least limited flexibility.

16. An apparatus according to claim 15, wherein each of said first and second conveying means includes only a single said belt, and driving means drivingly coupled to said first and second conveying means for effecting movement of the belt of said first conveying means at a substantially higher speed than the belt of said second conveying means.

17. An apparatus according to claim 16, wherein said first conveying means includes first and second support rollers disposed for rotation about substantially parallel but spaced horizontal axes, the belt of said first conveying means being supported on and extending between said first and second rollers, said first roller being disposed closely adjacent said one end of said tank means and submerged below but adjacent the surface of the liquid, said second roller being spaced longitudinally of said tank means away from said one end and submerged at a greater depth than said first roller so that the upper reach of the belt of said first conveying means projects linearly downwardly as it moves from said first roller toward said second roller; said second conveying means including at least third and fourth parallel rollers supported for rotation about parallel but spaced horizontal axes, said third and fourth rollers being substantially parallel with said first and second rollers, said third roller being disposed in the tank submerged below the surface of the liquid in close proximity to said second roller, said fourth roller being disposed adjacent the other end of said tank means and positioned above the surface of the liquid, the belt of said second conveying means being supported on and extending between said third and fourth rollers so that the upper reach of the belt moves from said third roller toward said fourth roller.

18. An apparatus according to claim 17, wherein said second conveying means includes guide means associated with the upper reach of the belt thereof for maintaining the upper reach in a nonstraight configuration as it extends between said third and fourth rollers, said nonstraight configuration including a first substantially straight and horizontally extending portion associated with the upper reach of the belt as it extends from said third roller to approximately said third location, and said nonstraight configuration including a second substantially straight portion which slopes upwardly at a substantial angle from approximately said third location to said outlet location.

19. An apparatus according to claim 1, wherein said elements are of light weight and have a specific gravity which is less than or approximately equal to the specific gravity of the liquid.

20. An apparatus according to claim 7, wherein said elements are of light weight and have a specific gravity which is less than or approximately equal to the specific gravity of the liquid.

* * * * *

UNITED STATES PATENT AND TRADEMARK OFFICE
CERTIFICATE OF CORRECTION

PATENT NO. : 4 567 906
DATED : February 4, 1986
INVENTOR(S) : Paul L. BRULE'

It is certified that error appears in the above-identified patent and that said Letters Patent is hereby corrected as shown below:

Column 14, line 20; change "Claim 1" to ---Claim 18---.

Signed and Sealed this

Third Day of June 1986

[SEAL]

Attest:

DONALD J. QUIGG

Attesting Officer

Commissioner of Patents and Trademarks